United States Patent [19]

Willinger

[11] Patent Number: 4,699,829
[45] Date of Patent: Oct. 13, 1987

[54] BIOLOGICAL FILTRATION PLANTS
[75] Inventor: Allan H. Willinger, Oakland, N.J.
[73] Assignee: Willinger, Bros. Inc., Oakland, N.J.
[21] Appl. No.: 855,395
[22] Filed: Apr. 24, 1986
[51] Int. Cl.⁴ ............................................. A41G 1/00
[52] U.S. Cl. .......................................... 428/17; 119/5;
156/61; 210/169; 428/26
[58] Field of Search ............................ 428/17, 23, 26;
210/169; 119/5; 156/61

[56] References Cited

U.S. PATENT DOCUMENTS

| | | | |
|---|---|---|---|
| 1,916,988 | 7/1933 | Pieschke | 428/24 X |
| 2,769,779 | 11/1956 | Vansteenkiste et al. | 210/169 X |
| 2,879,617 | 3/1959 | Popeil | 428/17 X |
| 3,146,153 | 8/1964 | Stein | 428/26 |
| 3,314,396 | 4/1967 | Willinger | 119/5 |
| 3,744,454 | 7/1973 | Willinger et al. | 428/23 X |
| 3,929,102 | 12/1975 | Suchowski et al. | 428/17 X |
| 3,943,659 | 3/1976 | Katz | 47/1.4 |
| 4,215,163 | 7/1980 | Lee | 428/26 X |
| 4,285,744 | 8/1981 | Rudolf et al. | 428/15 X |
| 4,318,945 | 3/1982 | Goldman et al. | 428/15 |
| 4,369,216 | 1/1983 | Willinger | 428/23 X |

Primary Examiner—Henry F. Epstein
Attorney, Agent, or Firm—Helfgott & Karas

[57] ABSTRACT

Ornamental artificial foliage for placement within an aquarium. The foliage formed of a material which is not harmful to the aquatic life within the aquarium. The ornamental foliage has a rough, granular surface texture over and above that normally required for the aesthetic appearance of the foliage. The rough, granular surface provides an increase in the surface area presented by the unmodified foliage to support increased growth and propagation of organisms which are active in causing biological filtration, thereby providing an effective source of biological filtration within the aquarium.

17 Claims, 8 Drawing Figures

2

BIOLOGICAL FILTRATION PLANTS

BACKGROUND OF THE INVENTION

This invention relates to aquarium filtration, and more particularly to improvements in the biological filtration of aquarium water.

Whenever aquatic animals are to be maintained within an aquarium environment, the quality of the water in which they live must be maintained at a suitable level. In addition to properly controlling the temperature, dissolved oxygen and other water qualities, the toxic material content of the water must be maintained at a sufficiently low level to prevent harm to the tank's inhabitants.

The main source of contaminants within an aquarium are the aquatic animals themselves. The metabolic waste of the aquatic animals is stored within the aquarium. In high concentrations, these waste products become toxic to the same animals that produced them.

To combat the problem of toxic waste build-up, three types of filtration approaches are generally utilized. One approach is physical filtration wherein the suspended waste material is physically trapped by mechanical filters. The filters utilize filtration material in the form of particles of gravel, or fluffy masses of synthetic resin fibers. Sand or gravel beds are well known materials which are also used in undergravel type of filters.

The second well known type of filtration is chemical filtration which relates to the removal or deactivation of mostly organics and any substance containing the element carbon. Activated carbon and ion exchange resins are commonly used materials. While the above forms of filtration are well known and frequently utilized, they are insufficient for purifying the water and eliminating some of the common known toxic waste products of the aquatic animals themselves.

The third type of filtration which is probably the most important and yet least utilized, is that of biological filtration. Such biological filtration is accomplished by means of living organisms, primarily bacteria. The presence of these biologically active bacteria in an aquarium is essential, since they serve to rid the tank of toxic ammonia.

Ammonia is a highly toxic substance harmful to many aquatic animals even if present in very low concentrations. Ammonia toxicity is pH sensitive. The higher the pH, the more toxic the ammonia becomes. Since marine aquariums generally maintain a higher pH than their fresh water counterparts, ammonia levels are of greater concern in the salt water aquarium. However, even in fresh water aquarium tanks ammonia can build up to high levels and cause toxicity in the water.

Ammonia is generated by the animals themselves which excrete ammonia directly. Additionally, ammonia is the end product of decaying organic matter such as uneaten food, dead animals, and feces. The ammonia is removed from the aquarium through biological filtration by a process called "nitrification". Nitrification is a two step process which requires two different types of bacteria to perform each step. These two types of bacteria are referred to as nitrifiers or nitrifying bacteria.

The first step in this sequence is performed by bacteria of the type Nitrosomonas. These bacteria remove ammonia from the water and, through biological oxidation, convert it to a different substance, nitrite. While nitrite is generally less toxic than ammonia, the removal of ammonia still does not provide adequate purification to the water. However, a different group of bacteria, the Nitrobacter bacteria quickly act on the nitrite and convert it further to nitrate, which is harmless to the aquatic inhabitants.

Both of these types of bacteria are of the aerobic form. However, even anaerobic bacteria are useful in reducing the ammonia, although they produce different end products, some of which are toxic to aquatic life. By maintaining an adequate supply of oxygen to the aquarium, the anaerobic bacteria can be kept in check and adequate aerobic bacteria are provided.

The aerobic nitrifying bacteria have two basic requirements to carry out their functions. The first is the need for adequate oxygen concentrations. The second is that they require a place to attach themselves.

Previously, the undergravel filters have been frequently utilized as a simple way of supplying the needs of these aerobic bacteria. The filter draws in oxygenated water through a gravel bed to which bacteria have attached themselves. While such gravel beds have been ideal for bacterial growth, they have apparent limitations. For example, there is a limit to the amount of gravel surface that can be supplied. This limit is basically the area of the aquarium base. The gravel, deep beneath the bed, retains limited numbers of aerobic bacteria. Furthermore, the depth of the gravel bed is limited by aesthetic requirements and by the height of the aquarium. Furthermore, while smaller gravel grain size is one way of supplying more surface area for the attachment of bacteria, the presence of the small gravel grains tends to clog the filter, and blocks the water passages through the gravel.

Accordingly, aquariums have heretofore presented limited surface areas upon which the aerobic bacteria can attach themselves and propagate.

SUMMARY OF THE INVENTION

The present invention is based upon a novel appreciation of the necessity for increasing the available surface area presented by the aquarium to which the aerobic bacteria can attach themselves, grow, and proliferate. It is common practice to utilize plants in an aquarium in order to enhance its aesthetic appearance. The presence of the plants also provides secure hiding places for the fish, and other benefits to the aquatic animals in the tank. Typically, artificial plants are currently utilized and they are intended to simulate the appearance of natural plants as closely as possible in order to give the aquarium a natural life-like appearance. The foliage placed in the aquarium may include ribs to simulate the veins of a leaf, as well as other crevices and dimples to simulate the natural appearance of the foliage. However, since they are generally formed of synthetic plastic material, except for the specific indentations, ribs, and corrugations and the like which are built into the mold, the surface of the foliage is typically a rather smooth texture with a finish resulting from usual plastic molding operations.

However, it has heretofore not been appreciated that the ornamental foliage can also be utilized as an enhanced source of biological filtration. Although the normal surface area of the foliage is insufficient to support a large population of aerobic bacteria, the surface of the foliage can be modified to significantly increase the available surface area for such aerobic organisms.

The increase can be achieved by providing the surface of the foliage with a rough, matte finish which would include hills and valleys of microscopic scale. The presence of the rough surface texture is insufficient to disturb the aesthetic appearance of the foliage. At the same time, because of the rough granular surface texture, the area presented and available for the propagation of bacterial organisms which are active in biological filtration is dramatically increased.

The matte finish can be provided by sand blasting the mold during the production of the mold. All plants produced from the mold will then have a matte finish. Other types of rough surface can be achieved by utilizing other processes. For example the surface of the plants can be directly etched to provide the matte finish by using chemical or laser etching techniques.

The provision of the rough, surface texture not only aids in the propagation of bacteria for biological filtration of the aquarium water, but also provides for diffusion of the light striking the surface of the foliage which gives the plants a more opaque rather than translucent appearance, thereby further improving the life-like nature of the foliage.

Accordingly, it is an object of the present invention to provide ornamental foliage for use within an aquarium environment which aids in the biological filtration of the aquarium without disturbing the aesthetic appearance of the foliage.

A further object of the present invention is to provide accessories for use in an aquarium, whereby the accessories not only enhance the environment of the aquarium, but also provide additional support organisms which cause biological filtration of the aquarium water.

Yet another object of the present invention is to provide for biological filtration of an aquarium through the use of ornamental accessories which support the propagation of aerobic organisms which cause biological filtration.

Still another object of the present invention is to provide ornamental foliage for use within an aquarium environment, the foliage having a rough, granular surface texture such as a matte finish, which increases the available surface area for the propagation of organisms active in biological filtration.

Another object of the present invention is to provide a method of forming accessories for enhancing the biological filtration of an aquarium, by providing a rough, granular surface texture on the accessory and thus increase its surface area beyond that required for the design, in order to provide additional area for the support of organisms which cause biological filtration of the aquarium water.

BRIEF DESCRIPTION OF THE DRAWINGS

In the drawings.

In the various figures in the drawing like reference characters designate like parts.

DESCRIPTION OF THE PREFERRED EMBODIMENT

Figure 1:
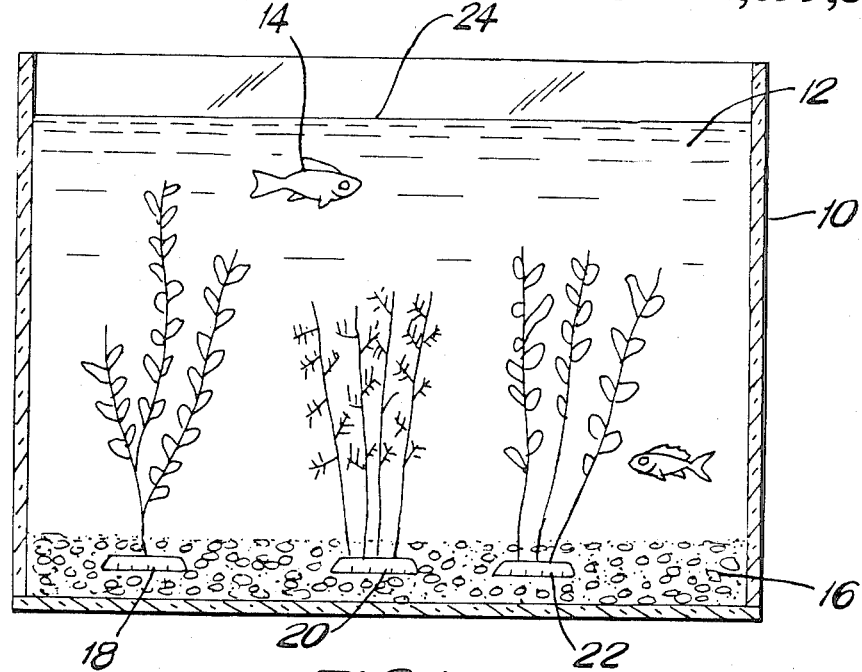
FIG. 1 is a side elevational view of an aquarium tank showing the presence of ornamental plants, in accordance with the present invention.

As shown in FIG. 1, aquarium 10 contains water 12 which provides an appropriate environment for the aquatic animals such as tropical fish 14. A gravel bed 16 is provided at the bottom of the aquarium. Anchored within the gravel bed are various artificial plants, including plants 18, 20 and 22. While the aquarium may typically include a filter for providing physical filtration of the suspended particles of toxic waste material, it may also include chemicals for chemical filtration of organic waste products contained within the water. Generally, there would also be provided additional aquarium equipment, such as an air pump, and the like.

In addition to these two forms of filtration, the aquarium would typically utilize biological filtration. Such biological filtration would include the presence of aerobic bacteria which would be available along the gravel bed. In a newly set up aquarium, biological filtration would not yet occur since the gravel is devoid of any nitrifying bacteria. However, the filtration process is often begun by starting a filter bed with a small amount of gravel from an old, established aquarium. With the presence of some fish in the aquarium, the waste products from the fish would permit the start-up bacteria to reproduce and spread over the new gravel.

The nitrifying aerobic bacteria require a high oxygen concentration such as is normally present in the water by reason of the surface air 24. However, it is important to provide adequate surface areas for the aerobic bacteria to attach themselves and propagate. As can be seen from FIG. 1, the only places available on which the aerobic bacteria can attach themselves are on the walls of the aquarium and the filter bed. However, this presents a somewhat limited available area.

The plants also constitute an available surface on which the aerobic bacteria can attach. However, again there is normally only a limited amount of surface area available on the plants.

Typically, the plants are formed of plastic material which can be molded. The particular shape is dependent upon the type of plant on which the mold is modeled. However, the surface of the plastic plant is normally one that is quite smooth. Occasionally, the surface may be striated in order to provide simulation of the veins of a leaf.

Figure 2:
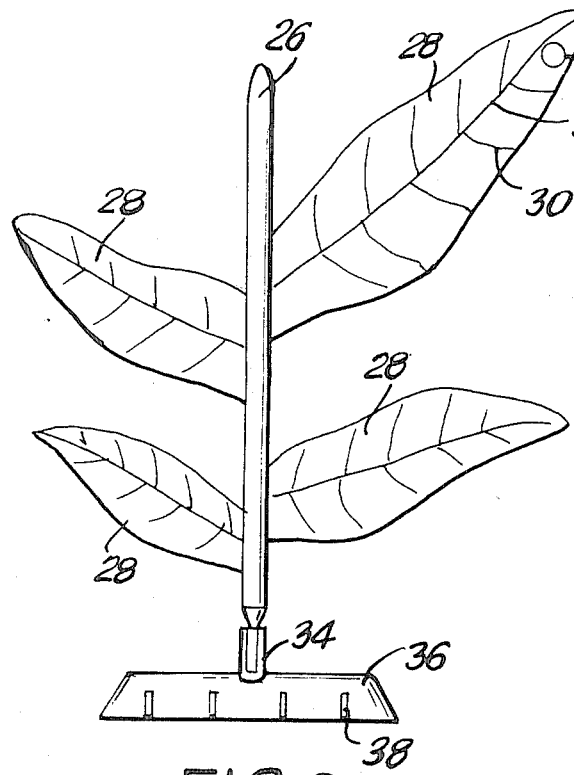
FIG. 2 is an enlarged fragmentary view of one of the plants in accordance with the present invention.

By way of example, FIG. 2 shows a plant including a stem 26 with a plurality of extending leaves 28. Each of the leaves includes venations 30 projecting from a center vein 32 to simulate the actual life-like appearance of the plant. The base of the stem 26 is seated in a receptacle 34 formed as part of a U-shaped trough 36 which seats in the gravel bed to secure the plant. Stiffening ribs may extend across the trough and provide individual compartments for retaining some gravel and thus maintain the plant in a vertical position.

Figure 3:
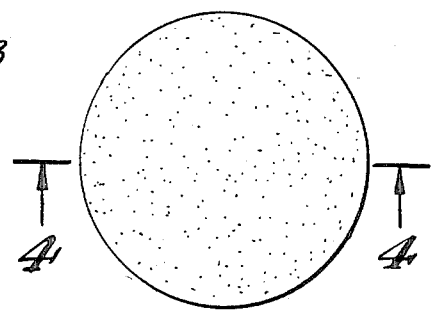
FIG. 3 is an enlarged micrographic view of a surface area of the ornamental plant of the present invention showing the rough, granular surface texture of the plant.
Figure 4:
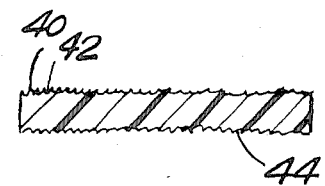
FIG. 4 is a cross sectional view taken along lines 4—4 of FIG. 3.

In FIG. 3, there is an enlargement of a micro section of the plant surface in accordance with the present invention. It will be seen that the surface includes a rough, granular texture including a multitude of projections 40 and valleys 42. The surface simulates a matte finish with a continuous roughness. Such surface texture can be formed on both the face and the under surface 44 of the plant.

Although the foliage includes a granular surface, it is formed of such small minute protrusions and depressions as not to be visible to the naked eye. Furthermore, it does not in any way disturb the aesthetic appearance of the foliage. On the other hand, it also serves to provide the necessary opacity to the appearance of the plant.

Usually the plant will be colored green or other lifelike plant color. Sometimes the opacity of the plant tends to disappear when viewed through the aquarium and the water. The matte surface retains the opaque character of the color and prevents it from being given a washed out, translucent appearance.

Because of the vast number of projections and depressions, there is a substantial increase in the surface area of the plant to which aerobic bacteria can adhere. The cavities, protrusions and grooves substantially increase the available locations for growth.

Figure 5:
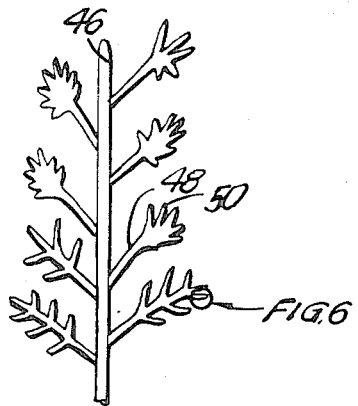
FIG. 5 is a fragmentary elevational view of another plant in accordance with the present invention.
Figure 6:
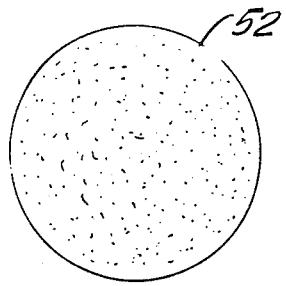
FIG. 6 is an enlarged micrographic view of the surface area of the plant shown in FIG. 5.

The rough, granular finish can be provided on the type of plant as shown in FIG. 2, but also on any plant, including a typical bushy type plant, shown in FIGS. 5 and 6. From stem 46 there projects a plurality of branches 48 with many individual leaves 50. Each of the stems and leaves provides a rough, granular surface finish 52, shown enlarged at FIG. 6 which would include a multitude of protrusions and depressions along its surface to increase the surface area available for the organisms active in biological filtration.

Figure 7:
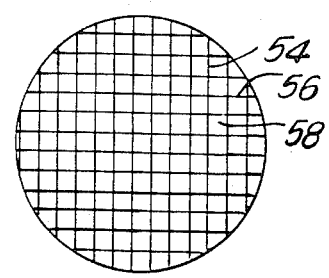
FIG. 7 is an enlarged view of a surface area in accordance with a prior art ornamental plant.

FIG. 7 shows a typical prior art surface texture provided with stippling. The stippling is shown in a grid pattern including vertical grooves 54 and horizontal grooves 56. Such stippling still presents large spaces 58 of flat surface areas but does not provide adequate surface area to which the bacteria can adhere. This can be contrasted with the surfaces shown in FIGS. 3 and 6 in which the surface area is greatly increased.

The particular rough, granular surface area can be provided on the plants in numerous ways. One way would be through a sand blasting operation. The sand blasting can be achieved either by initially sand blasting the mold in which the plastic material is cast. In this way, each time the foliage is produced in the mold, it includes a rough, granular finish.

Alternately, the plant can be formed from a standard mold and after production of the foliage its surface area can be sand blasted. This would require sand blasting of each individual plant and may be more expensive.

Another method of producing the rough granular finish can be through etching. Chromic acid can be utilized to etch the plastic material in order to achieve the rough granular surface. Other techniques can also be utilized.

It should be appreciated that the presence of the plants with the rough granular finish would considerably enhance the biological filtration capabilities of the aquarium so that the aquarium can effectively utilize biological filtration.

Figure 8:
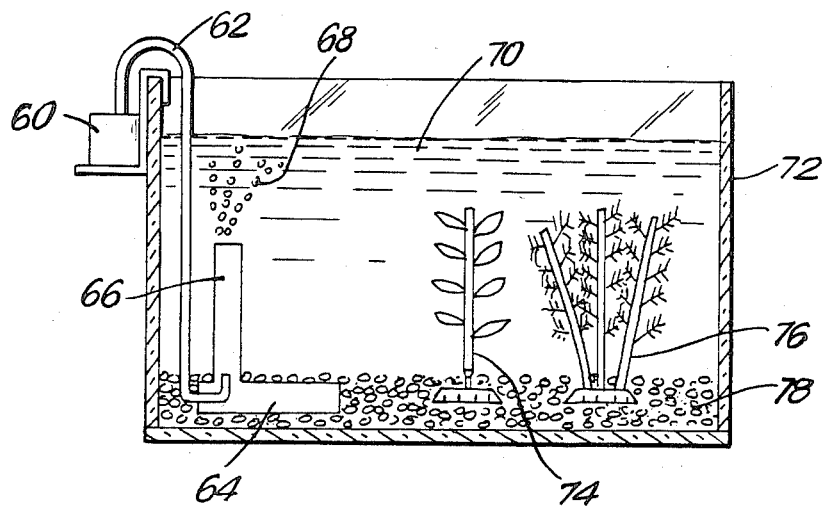
FIG. 8 is a cross-sectional view through an aquarium containing an air pump for providing an additional source of oxygenation for the aquarium water and to promote the propagation of aerobic bacterial growth on the surface area of the plants.

As shown at FIG. 8, in order to be sure that there is an adequate oxygen concentration in the aquarium water for the growth of the aerobic bacteria, there can be included an air pump 60 which pumps air through a supply tube 62 into a bottom filter 64. The air flows up through an air tube 66 in the form of air bubbles 68 which serve to oxygenate the water 70 contained in the aquarium tank 72. The plants 74, 76 anchored within the gravel bed 78 would then provide an adequate concentration of aerobic bacteria on their rough, matte surface to effectively filter the aquarium water.

There has been disclosed heretofore the best embodiment of the invention presently contemplated. However, it is to be understood that various changes and modifications can be made thereto without departing from the spirit of the invention.

What is claimed:

1. Ornamental foliaqe for disposition within an aquarium environment, the foliage being formed of a plastic material which is not harmful to the aquatic life, and having a rough, granular surface texture beyond that needed for aesthetic purposes to increase the surface area presented by said foliage available for the propagation of organisms which are active in causing biological filtration of the aquarium water without disturbing the aesthetic appearance of the foliage.

2. Ornamental foliage as in claim 1, wherein said foliage includes venations to simulate the veins of a leaf.

3. Ornamental foliage as in claim 1, wherein said rough, granular surface texture is substantially uniform throughout the foliage.

4. Ornamental foliage as in claim 1, wherein said foliage comprises a base for positioning the same in an aquarium tank, a plurality of branches extending from said base, and leaves extending from said branches.

5. Ornamental foliage as in claim 4, wherein said foliage is formed of a molded plastic material.

6. Ornamental foliage as in claim 5, wherein said foliage surface is sandblasted.

7. Ornamental foliage as in claim 5, wherein said foliage is formed from a sandblasted mold.

8. Ornamental foliage as in claim 5, wherein said foliage surface is acid etched.

9. An aquatic filter for biological filtration of an aquarium comprising an ornamental plastic plant accessory for positioning within the aquarium for enhancement of the aesthetic appearance of the aquarium, a microscopic matte finish on the accessory to increase its surface area beyond that needed for aesthetic purposes to adequately support the propagation of organisms which are active in biological filtration of the aquarium water without disturbing the aesthetic appearance of the accessory.

10. An aquatic filter as in claim 9, and further comprising means for providing adequate oxygen to the aquarium water to support the growth of organisms.

11. An aquatic filter as in claim 9, wherein the matte finish is uniform along the plant surfaces.

12. An aquatic filter as in claim 9, wherein the matte finish is the result of a sandblasting procedure.

13. An aquatic filter as in claim 9, wherein the matte finish is the result of acid etching.

14. A method of forming accessories for enhancing the environment of an aquarium comprising:
   (a) molding an aquarium plastic plant accessory structure from a material which is not harmful to aquatic life, and
   (b) providing a microscopic rough, granular surface on the aquarium accessory to increase its surface area beyond that needed for the accessory design, to provide additional area for the support and propagation of organisms which are active in biological filtration of the aquarium water.

15. The method of claim 14, wherein said accessory is formed of molded plastic material, and comprising the step of sandblasting the plastic material to produce the rough, granular surface.

16. The method of claim 14 and comprising the step of preparing a mold for the accessory structure; sandblasting the mold, and molding the accessory structure within the sandblasted mold.

17. The method of claim 14, and comprising the step of etching the surface of the accessory structure to provide the rough, granular surface.

* * * * *